(No Model.)

A. P. MORROW.
BICYCLE SADDLE.

No. 524,068. Patented Aug. 7, 1894.

Witnesses
Josiah Laird
J. A. Tatro

Inventor
Alexander P. Morrow.
by John W. Culmer
his Attorney

UNITED STATES PATENT OFFICE.

ALEXANDER P. MORROW, OF NEW BRIGHTON, ASSIGNOR TO THE ECLIPSE BICYCLE COMPANY, OF BEAVER FALLS, PENNSYLVANIA.

BICYCLE-SADDLE.

SPECIFICATION forming part of Letters Patent No. 524,068, dated August 7, 1894.

Application filed September 7, 1893. Serial No. 485,015. (No model.)

*To all whom it may concern:*

Be it known that I, ALEXANDER P. MORROW, a citizen of the United States, residing at New Brighton, in the county of Beaver and State of Pennsylvania, have invented certain new and useful Improvements in Bicycle-Saddles; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved bicycle saddle, and particularly, to the construction of the leather of such saddles with a netting or stiffening web of wire or other material, attached to or embedded wholly or partially within the leather, for the prevention of stretching or distortion of said seat by use.

Figure 1:
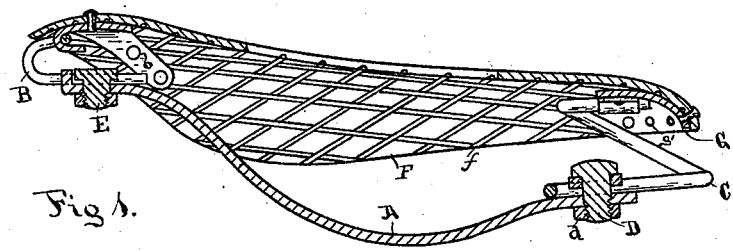
Figure 2:
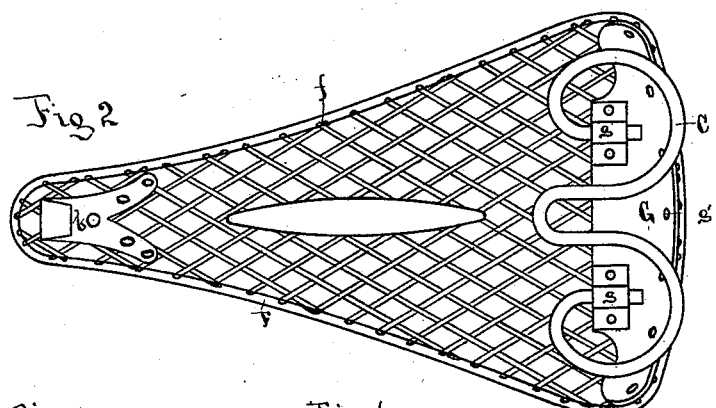
Figures 3, 4:
Figure 5:
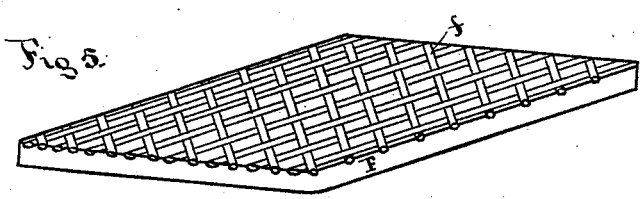

In the accompanying drawings Figure 1 is a vertical longitudinal sectional view of a bicycle saddle embodying my improvements; Fig. 2, an interior plan view of the same from below; Figs. 3 and 4, vertical sectional views or the clip bolt D and its nut $d$, and Fig. 5 a broken perspective view of a portion of the seat F.

I prepare leather for saddle seats by attaching to or embedding in the flesh side of selected sole leather, as F, a woven net of stiff brass or other metal wire $f$; the leather thus prepared is cut or stamped into the required form for the seat and the netting and leather may be bound at the edges, if desired, although ordinarily this is not required. At the point, or horn, of a seat thus formed, a hook $b$ is riveted through the seat and forms a fastening for the coiled spring B. At the rear of the seat F a plate G is made fast within said seat by rivets $g'$ passing through said plate and the netting and leather supported thereon. Upon the plate G are riveted smaller plates $g, g$, which form sockets to receive the ends of the spring C. A clip E of ordinary form clamps the free end of the coiled spring B to a longitudinal plate spring A by means of its bolt passing through a slot therein, and a clip bolt D fastens the spring G through a similar slot at the other extremity of the longitudinal spring A.

I make the clip bolt D, as shown in Figs. 3 and 4, with a T shaped head having parallel recesses, upon its lower surface, for receiving the parallel ends of the spring C. It will be seen that the clip bolt D, with its nut $d$, form a simple means of straining or adjusting the saddle seat F, upon its longitudinal spring A, as the nut $d$ may be loosened with one hand, the seat strained with the other hand and the nut $d$ refastened quickly and effectively; also, that the netting $f$ attached to the leather F prevents the stretching of said leather, maintains the elasticity of the seat and retains the form as manufactured.

I am aware that "clip bolts" or clamps of the form shown at D, have been known and illustrated before, notably in United States Patent No. 473,493, dated April 26, 1892, and I do not, therefore, claim that particular form of clamp.

I claim as my invention—

1. A bicycle saddle seat having its leather reinforced by a stiff wire or other netting embedded in or made fast to the leather as shown and described.

2. In a bicycle saddle the combination with the leather of the seat, of a netting of wire or other material made fast thereto, whereby the elasticity of the seat is increased, stretching prevented and its form preserved, as shown and described.

In testimony whereof I affix my signature in presence of two witnesses.

ALEXANDER P. MORROW.

Witnesses:
  C. C. ROBINGSON,
  E. C. CARTER.